UNITED STATES PATENT OFFICE.

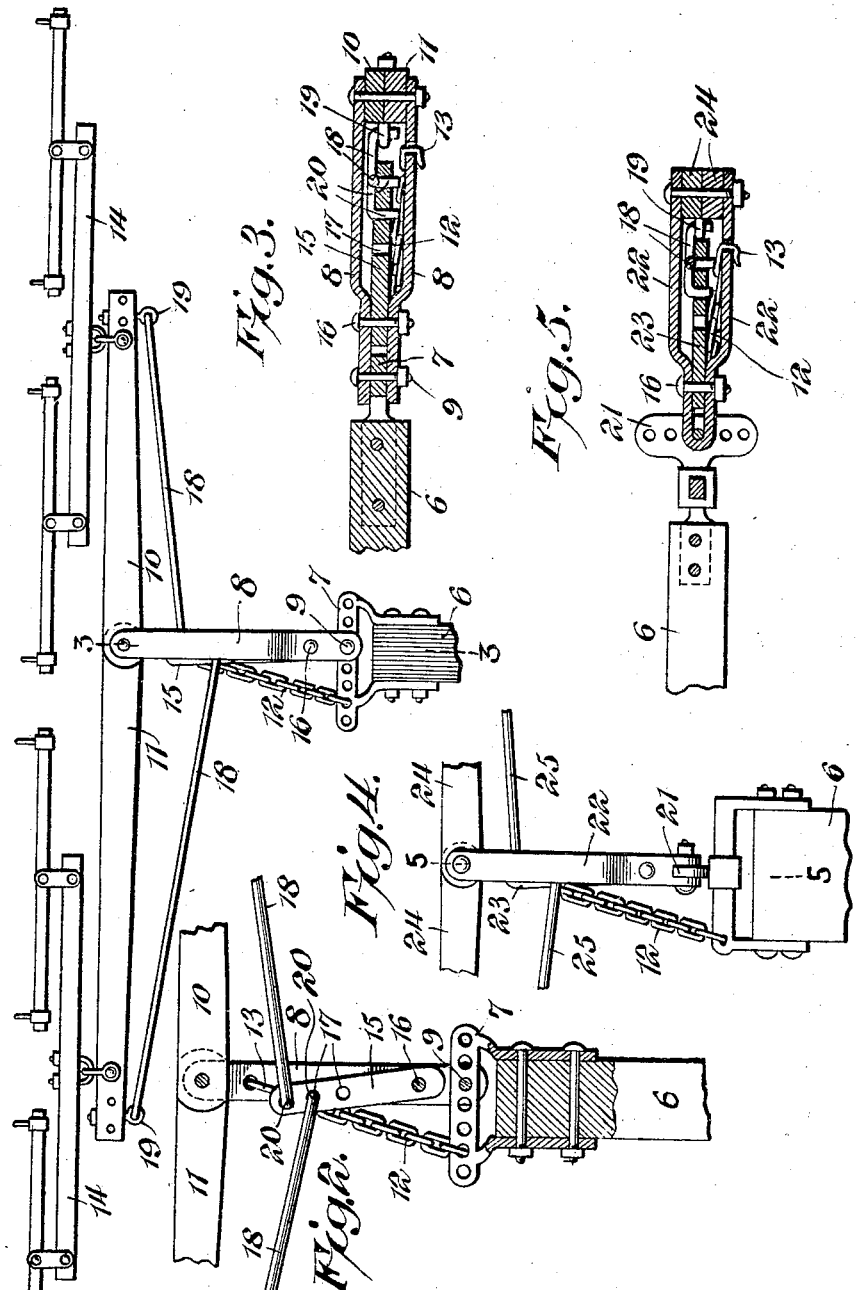

CHARLES M. LOFLIN, OF ELLIS, KANSAS.

DRAFT-EQUALIZER.

No. 880,804.      Specification of Letters Patent.      Patented March 3, 1908.

Application filed June 27, 1907. Serial No. 381,104.

*To all whom it may concern:*

Be it known that I, CHARLES M. LOFLIN, a citizen of the United States, residing at Ellis, in the county of Ellis and State of Kansas, have invented a new and useful Draft-Equalizer, of which the following is a specification.

The principal object of the present invention is to provide novel, simple and highly effective means for equalizing the draft when a greater number of the draft animals are located on one side of the central line of draft of an implement than on the other, or when one set of animals is located nearer the center line of draft than the opposite set, thereby providing means which is useful in a number of ways, but particularly so with plows, as none of the animals will have to walk on plowed ground.

In the accompanying drawings: Figure 1 is a top plan view of the preferred form of construction. Fig. 2 is a horizontal sectional view therethrough. Fig. 3 is a vertical sectional view on the line 3—3 of Fig. 1. Fig. 4 is a slightly modified form of construction. Fig. 5 is a vertical sectional view on the line 5—5 of Fig. 4.

Similar reference numerals designate corresponding parts in all the figures of the drawings.

In the embodiment disclosed in the first three figures, the front end of a plow is shown at 6, and has a horizontal clevis 7 fixed thereto. A draft member, comprising spaced bars 8, has its rear end adjustably connected by a bolt 9 to the clevis 7, and to and between the front ends of the bars 8 are pivoted the inner ends of relatively swinging evener beam sections 10 and 11, said sections being of different lengths. A stay chain or cable 12, connected to the clevis 7, has a hook 13 at its front end that is engaged in an opening in the lower bar 8 of the draft member. The usual whiffletrees 14 are connected to the outer ends of the evener beam sections 10 and 11.

A lever 15, fulcrumed at its rear end to and between the draft member bars 8, as shown at 16, has a plurality of openings 17 in its front end, and draft devices, in the form of links 18, have their outer ends respectively connected by eye bolts 19 or other suitable devices to the outer ends of the draft beam sections 10 and 11. The inner ends of the links 18 are provided with hooked terminals 28 that are detachably engaged in certain of the openings 17.

It will be observed by reference to Figs. 1 and 2 that the link 18, which is connected to the shorter section 10, is engaged with the lever 15 at a greater distance from the fulcrum 16 than the link 18, which is connected to the longer evener beam section 11. Thus it will be evident that the draft animals, connected to the shorter section of the evener beam, will have a greater leverage against the pull of the draft animals attached to the longer section of the evener beam. Consequently the draft will be equalized, while the animals on one side will be located nearer the central line of draft than those on the other side. While the present embodiment is designed for four horses, it will be evident that by altering the relative length of the parts, the number of draft animals can be readily changed.

The structure disclosed in Figs. 4 and 5 is a slight modification, in that it is designed for use with a vertical clevis. Such a clevis is designated 21, and connected thereto is the draft member comprising spaced bars 22 between which is fulcrumed a lever 23, this lever being disposed longitudinally of the draft member, and consequently of the line of draft, while being located transversely of the evener beam. The evener beam sections are designated 24, and their outer ends are connected by links 25 with the lever 23 at different distances from its fulcrum. It will be clear that this structure is substantially the same in operation as that already described, and has the same advantages.

From the foregoing, it is thought that the construction, operation and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a draft equalizer, the combination with a draft member, of a lever fulcrumed at one end thereon, an evener beam comprising sections pivoted at their inner ends to the draft member, whiffletrees connected to the beam sections at different distances from the draft member, and links of different lengths connected at their outer ends respectively to the beam sections at different distances from the draft member and on the same side of the pivot as the whiffletrees, said links being connected at their inner ends directly to the lever at different distances from and on the same side of the fulcrum of said lever.

2. In a draft equalizer, the combination with a draft member having means at its rear end for attachment to a clevis and comprising spaced bars, of a lever located between the bars longitudinally thereof and fulcrumed at its rear end to the same in advance of said attaching means, an evener beam comprising sections, the inner ends of which are located between the front ends of the bars in advance of the lever, a pivot connecting the sections and bars, whiffletrees connected to the outer ends of the beam sections, links connected to the outer portions of the beam sections at different distances from the pivot and having their inner and rear ends connected to the lever on the same side of and at different distances from the fulcrum thereof, and a flexible device connected to the draft member and having means for attachment to the clevis, said device permitting the swinging movement of the draft member in one direction and limiting it in an opposite direction.

In testimony, that I claim the foregoing as my own, I have here affixed my signature in the presence of two witnesses.

CHARLES M. LOFLIN.

Witnesses:
 JOHN HERBERT,
 FRED W. CROSS.